US008651943B2

(12) United States Patent
Okada

(10) Patent No.: US 8,651,943 B2
(45) Date of Patent: Feb. 18, 2014

(54) GAMING MACHINE

(75) Inventor: Kazuo Okada, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 223 days.

(21) Appl. No.: 13/151,793

(22) Filed: Jun. 2, 2011

(65) Prior Publication Data

US 2012/0309490 A1 Dec. 6, 2012

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .................. 463/20; 463/13; 463/14; 463/15; 463/16; 463/17; 463/18; 463/19; 463/25; 275/292

(58) Field of Classification Search
USPC ................................ 463/13–20, 25; 273/292
See application file for complete search history.

(56) References Cited

U.S. PATENT DOCUMENTS

| | | | | |
|---|---|---|---|---|
| 6,422,940 | B1 * | 7/2002 | Walker et al. | 463/13 |
| 6,572,473 | B1 | 6/2003 | Baerlocher | |
| 6,918,830 | B2 | 7/2005 | Baerlocher | |
| 7,473,175 | B2 | 1/2009 | Baerlocher | |
| 2003/0119576 | A1 * | 6/2003 | McClintic et al. | 463/20 |
| 2007/0225061 | A1 * | 9/2007 | Naobayashi | 463/20 |
| 2007/0232390 | A1 * | 10/2007 | Sato | 463/25 |
| 2009/0075718 | A1 * | 3/2009 | Yoshizawa | 463/20 |

* cited by examiner

*Primary Examiner* — Adetokunbo O Torimiro
(74) *Attorney, Agent, or Firm* — KMF Patent Services, PLLC; Kenneth M. Fagin, Esq.; S. Peter Konzel, Esq.

(57) ABSTRACT

A gaming machine for changing a payout ratio through technical intervention of a player is provided. The gaming machine comprises: a display arranging a plurality of symbols; and a control section executing a first game rearranging the plurality of symbols with a preset payout ratio, and awarding a payout to a player on the basis of a result of the first game, and executing a payout ratio increasing game that increases the payout ratio and is only executable when predetermined conditions are satisfied, and awarding a payout to the player on the basis of a result of the payout ratio increasing game, wherein the control section executes the payout ratio increasing game, in which the preset payout ratio changes in a predetermined range.

5 Claims, 14 Drawing Sheets

SYMBOL TABLE FOR ORDINARY GAME

| | | COLUMN 1 (L1) | COLUMN 2 (L2) | COLUMN 3 (L3) | COLUMN 4 (L4) | COLUMN 5 (L5) |
|---|---|---|---|---|---|---|
| CODE NO | RANDOM NUMBER | SYMBOL | SYMBOL | SYMBOL | SYMBOL | SYMBOL |
| 0 | 0-3277 | J | SPECIAL SYMBOL | A | Q | J |
| 1 | 3278-6555 | Q | A | J | J | A |
| 2 | 6556-9833 | ANGELFISH | Q | ANGELFISH | ANGELFISH | ANGELFISH |
| 3 | 9834-13111 | J | CLOWNFISH | TUNA | Q | J |
| 4 | 13112-16389 | Q | TUNA | COELACANTH | K | A |
| 5 | 16390-19667 | COELACANTH | SPECIAL SYMBOL | ANGELFISH | ANGELFISH | ANGELFISH |
| 6 | 19668-22945 | A | ANGELFISH | SPECIAL SYMBOL | A | COELACANTH |
| 7 | 22946-26223 | CLOWNFISH | CLOWNFISH | A | K | SPECIAL SYMBOL |
| 8 | 26224-29501 | TUNA | K | J | CLOWNFISH | K |
| 9 | 29502-32779 | CLOWNFISH | COELACANTH | CLOWNFISH | Q | CLOWNFISH |
| 10 | 32780-36057 | A | SPECIAL SYMBOL | A | CLOWNFISH | Q |
| 11 | 36058-39335 | Q | A | Q | TUNA | ANGELFISH |
| 12 | 39336-42613 | TUNA | CLOWNFISH | CLOWNFISH | SPECIAL SYMBOL | K |
| 13 | 42614-45891 | COELACANTH | CLOWNFISH | K | K | CLOWNFISH |
| 14 | 45892-49169 | K | J | ANGELFISH | TUNA | TUNA |
| 15 | 49170-52447 | A | TUNA | Q | CLOWNFISH | J |
| 16 | 52448-55725 | CLOWNFISH | TUNA | SPECIAL SYMBOL | A | SPECIAL SYMBOL |
| 17 | 55726-59003 | J | ANGELFISH | A | CLOWNFISH | CLOWNFISH |
| 18 | 59004-62281 | Q | SPECIAL SYMBOL | CLOWNFISH | ANGELFISH | TUNA |
| 19 | 62282-65535 | ANGELFISH | SPECIAL SYMBOL | TUNA | COELACANTH | Q |

RANGE OF RANDOM NUMBERS:0-65535

FIG. 6

UNIT PAYOUT AMOUNT TABLE

| BONUS TYPE | UNIT PAYOUT AMOUNT |
|---|---|
| BLUE MARLIN | 10000 |
| BLUEFIN TUNA | 5000 |
| DOLPHIN | 4000 |
| NAPOLEON FISH | 3000 |
| YELLOWFIN TUNA | 2000 |
| ACANTHOCYBIUM SOLANDRI | 1500 |
| BLACK SEA BASS | 1500 |
| HIPPOGLOSSUS STENOLEPIS | 1000 |
| ... | ... |

FIG. 9

PROBABILITY TABLE FOR PAYOUT RATIO LNCREASING GAME

| RANDOM NUMBER | WINNING AWARD TYPE |
|---|---|
| 0-9 | BLUE MARLIN |
| 10-19 | BLUEFIN TUNA |
| 19-22 | DOLPHIN |
| 23-25 | NAPOLEON FISH, BLACK SEA BASS |
| 26-48 | YELLOWFIN TUNA, HIPPOGLOSSUS STENOLEPIS |
| 49-116 | ACANTHOCYBIUM SOLANDRI,BLACK SEA BASS |
| 117-210 | BLACK SEA BASS, HIPPOGLOSSUS STENOLEPIS |
| 211-293 | ACANTHOCYBIUM SOLANDRI,BLACK SEA BASS, HIPPOGLOSSUS STENOLEPIS |
| . . . | . . . |

RANGE OF RANDOM NUMBERS: 0-65535

FIG. 10

GAMING MACHINE

BACKGROUND OF THE INVENTION

1. Field of the Invention

The present invention relates to a gaming machine.

2. Description of the Prior Art

Currently, existing gaming machines are provided with a display arranged with a plurality of symbols, and the symbols are rearranged through an input operation of an input device, and a payout is awarded to a player according to the combination of rearranged symbols. In those above existing gaming machines, player's operation can affect the movement of the symbols (referring to Patent Documents 1 to 3).

DOCUMENTS FOR BACKGROUND OF THE INVENTION

Patent Documents

Patent Document 1: U.S. Pat. No. 7,473,175
Patent Document 2: U.S. Pat. No. 6,572,473
Patent Document 3: U.S. Pat. No. 6,918,830

SUMMARY OF THE INVENTION

Although current gaming machines are designed so that technical intervention by a player can affect the movement of symbols, they do not provide the opportunity for the payout ratio to be changed through technical intervention of a player. The present invention is directed to a gaming machine in which the payout ratio can be changed through technical intervention of a player.

An aspect of the present invention is a gaming machine, which comprises: a display arranging a plurality of symbols; and a control section executing a first game rearranging the plurality of symbols with a preset payout ratio, and awarding a payout to a player on the basis of a result of the first game, and executing a payout ratio increasing game that increases the payout ratio and is only executable when predetermined conditions are satisfied, and awarding a payout to the player on the basis of a result of the payout ratio increasing game, wherein the control section executes the payout ratio increasing game, in which the preset payout ratio changes in a predetermined range.

According to the above aspect of the invention, the payout ratio set in the first game does not need to be changed, and the payout ratio actually paid out to the player can be changed depending on the result of the payout ratio increasing game.

Another aspect of the present invention is that the gaming machine further comprises an operating section activating acceptance of an operation if the predetermined conditions are satisfied, wherein in the payout ratio increasing game, the result of the payout ratio increasing game is determined on the basis of an operation result of the operating section.

According to the above aspect of the invention, the player can enjoy playing the payout ratio increasing game different from the first game through his own operation of an operating section, which is activated only when the payout ratio increasing game is being executed.

Another aspect of the present invention is that the gaming machine further comprises a display section displaying a payout awarded to the player in the payout ratio increasing game.

According to the above aspect of the invention, the player may be highly concerned about the payout ratio increasing game due to the displayed payout in the payout ratio increasing game. The payout may be in the form of a number of coins to be actually paid out, or may alternatively be a ratio of the payout ratio in the payout ratio increasing game to the target payout ratio set in the first game (base game).

EFFECT OF THE INVENTION

The present invention provides a gaming machine that can change a payout ratio through technical intervention of a player.

BRIEF DESCRIPTION OF THE DRAWINGS

FIG. 6 is a diagram of a symbol table for an ordinary game (base game);

FIG. 9 is a diagram of a unit payout amount table;

FIG. 10 is a diagram of a probability table for a payout ratio increasing game;

DETAILED DESCRIPTION

Below, the embodiments of the present invention are described with reference to the accompanying drawings.

[Description of Functional Flow Chart]

Figure 1:
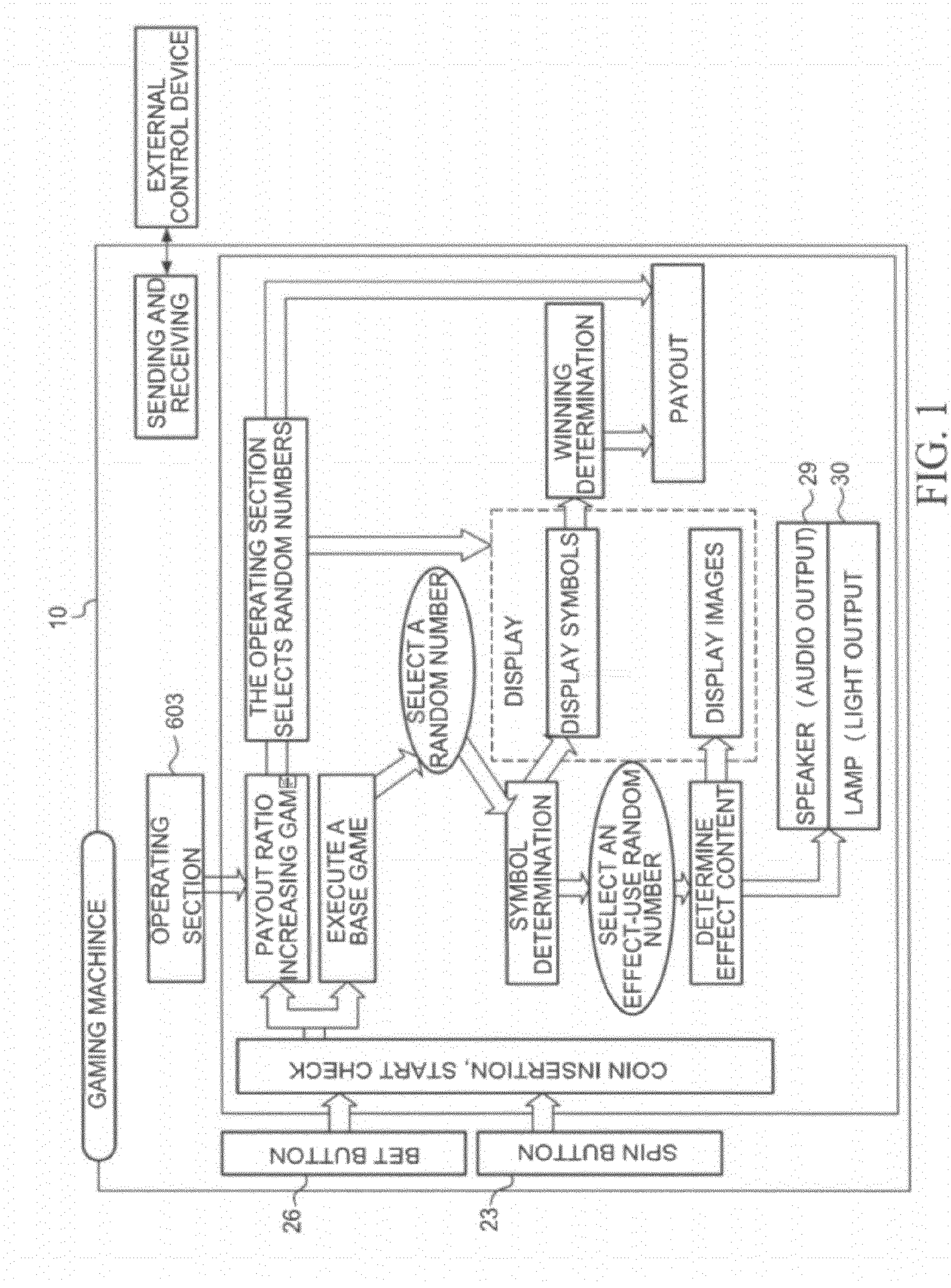
FIG. 1 is a general schematic view of a gaming machine.

Referring to FIG. 1, basic functions of a gaming machine (slot machine) according to an embodiment are described. FIG. 1 is a functional flow chart of a gaming machine 10 according to an embodiment of the present invention.

<Coin Insertion, Start Check>

First, in the gaming machine 10, as a start condition of a base game, a check is made as to whether a BET button 26 is pushed by a player, and next a check is made as to whether a spin button 23 is pushed by the player.

<Symbol Determination>

Next, when the spin button 23 is pushed by the player, the gaming machine 10 selects random numbers for symbol determination, and determines symbols to be displayed when the scrolling of the symbol sequence is stopped, corresponding to each of a plurality of video reels displayed on a display 16.

<Symbol Display>

Next, the gaming machine 10 enables the symbol sequence of each video reel to start scrolling, and to stop scrolling, so as to display the determined symbols to the player.

<Winning Determination>

Subsequently, when the symbol sequence of each video reel stops scrolling, the gaming machine 10 determines whether the combination of symbols displayed to the player is a winning combination.

<Payout>

Next, when the result of the base game is that the combination of symbols displayed to the player is a winning combination, the gaming machine 10 gives a special prize (payout) corresponding to the type of combination of symbols. For example, when displaying a combination of symbols related to payout of coins, the gaming machine 10 pays out a number of coins corresponding to the combination of symbols. The payout can also be in the form of credit information equivalent to the number of coins to be paid out into an integrated circuit (IC) card in place of actual coins.

In addition, the gaming machine 10 executes a payout ratio increasing game when predetermined conditions are satisfied (a triggered state). The payout ratio increasing game offers the player relatively good odds of awarding a payout without changing the payout ratio set in the base game. In the game, the payout is easily awarded, and the result does not change the payout ratio in the base game, but instead increases the overall payout ratio of the game, including the base game and the payout ratio increasing game.

If the payout ratio increasing game is started, the gaming machine 10 activates the acceptance of the operation input of an operating section (control lever), and displays an image of the payout ratio increasing game (for example, a fishing game) on the display 16, and the player can play the payout ratio increasing game by watching the image of the display 16 while operating the operating section. Subsequently, the player is awarded a payout on the basis of the operation result of the operating section. Specifically, in the game (for example, fishing game) displayed on the display 16 of the gaming machine 10, if the player wins the game by operating the operating section, a payout corresponding to the result of the game is awarded to the player as the payout of the payout ratio increasing game.

<Effect Determination>

The gaming machine 10 performs effects by displaying images on the display 16, outputting light by a lamp 30, and outputting voice through a speaker 29. The gaming machine 10 selects a random number and determines contents of the effects on the basis of the symbols determined through selection.

[Overall Structure of Gaming Machine]

Next, the structure of the gaming machine 10 is described.

Figure 2:
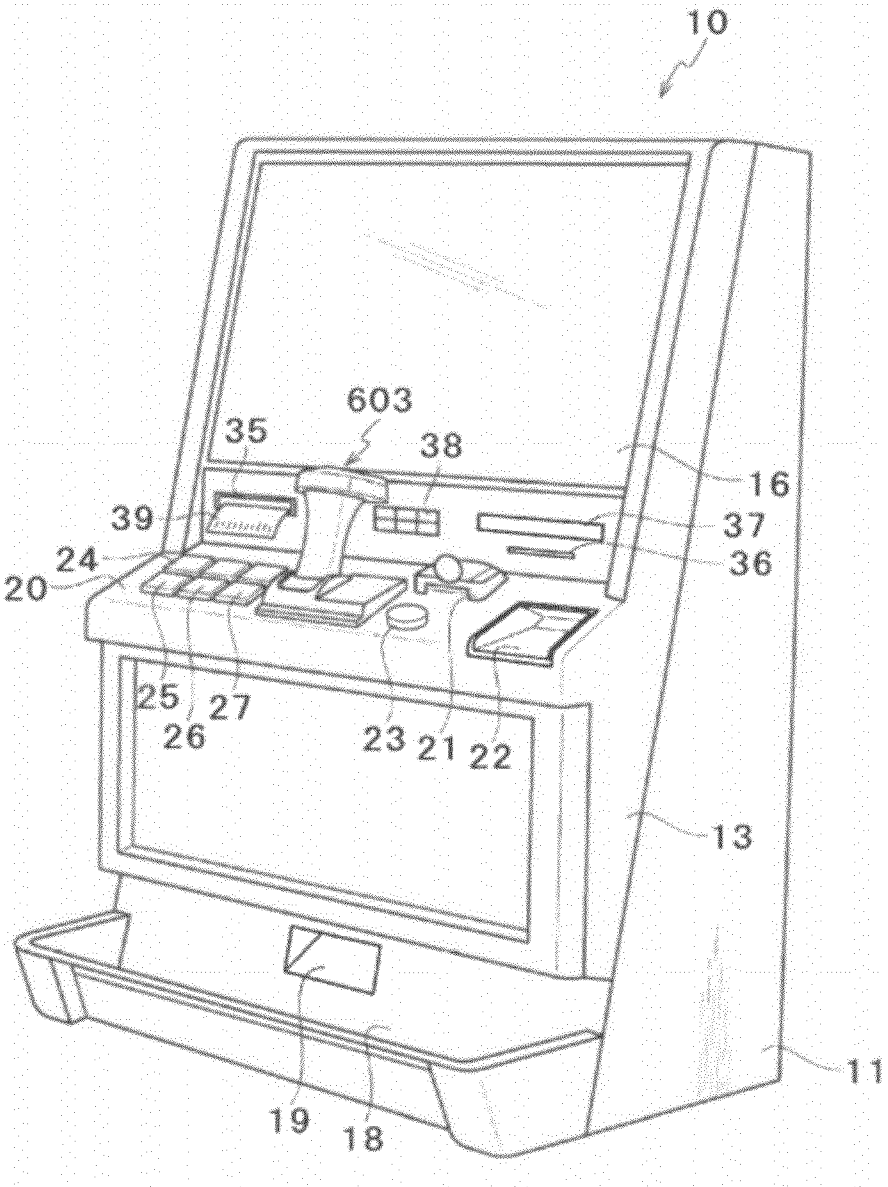
FIG. 2 is a perspective view of a gaming machine.

As shown in FIG. 2, the gaming machine 10 comprises a cabinet 11 and a main door 13 at the front of the cabinet 11. The main door 13 is provided with a display 16. The display 16 comprises a transparent liquid crystal panel for displaying a variety of information. The display 16 displays a display window 150 (video reels 151 to 155) (referring to FIG. 5) for scroll-displaying and arranging a plurality of symbols 501 in a base game, and displays a variety of game-related information or images as required. In addition, in a payout ratio increasing game, the display 16 displays images related to the payout ratio increasing game.

This embodiment also exemplifies a case where the display 16 electrically displays a plurality of symbols 501 in 5 columns and 3 rows. However, the present invention is not limited thereto.

In addition, a credit-value display section and a payout-value display section may also be displayed in the display 16. The credit-value display section displays a total number that the gaming machine 10 can pay out to a player (which will be referred to as total credit-value). The payout-value display section displays a number of coins to be paid out when a combination of symbols stopped on the pay line is a winning combination.

A control panel 20, a coin receiving slot 21, and a bill validator 22 are provided below the display 16. The control panel 20 is provided with a plurality of buttons 23 to 27 and a control lever 603 serving as an operating section. The buttons 23 to 27 and the control lever 603 allow instructions related to game progress to be input. The coin receiving slot 21 enables a coin to be received in the cabinet 11.

The control panel 20 is provided with a spin button 23, a change button 24, a cash out button 25, a 1-BET button 26, and a MAX-BET button 27. The spin button 23 is a button for inputting an instruction to start the scroll of symbols. The change button 24 is a button to be used when a player asks staff in the game arcade for exchange of money. The cash out button 25 is a button for inputting an instruction to pay out the coins of the total credit-value into a coin tray 18.

The 1-BET button 26 is a button for inputting an instruction to bet one coin per game from among the coins available according to the total credit-value. The MAX-BET button 27 is a button for inputting an instruction to bet a maximum coins per game (for example, 50 coins) from among the coins available according to the total credit-value.

The bill validator 22 validates whether the bill is genuine and receives the genuine bill in the cabinet 11. In addition, the bill validator 22 can read a ticket 39 having a barcode which will be described later. When the bill validator 22 reads the ticket 39 having a barcode, it outputs a reading signal relating to the read content to a main Central Processing Unit (CPU) 41.

A belly glass 34 is provided to a lower frontal surface of the main door 13, i.e., below the control panel 20. A character of the gaming machine 10 and the like are drawn on the belly glass 34.

A ticket printer 35, a card reader 36, a data display 37, and a keypad 38 are provided below the display 16. The ticket printer 35 prints, on to a ticket, a barcode having encoded data containing credit-value, date and time, identification number of a gaming machine 10 or the like, thereby issuing a ticket. 39 having a barcode attached thereto. A player can play a game in another gaming machine 10 with the ticket 39 having the barcode, or exchange the ticket 39 having the barcode for bill or the like at a change booth or the like of the game arcade.

The card reader 36 reads/writes data from/into a smart card. The smart card is carried by a player, and stores therein data for identifying the player, data relating to a history of games played by the player, or the like.

The data displayer 37 includes a fluorescent display or the like, and displays the data read by the card reader 36 and the data input by the player through the keypad 38. The keypad 38 is for entering instructions or data relating to issuing of a ticket or the like.

Figure 3:
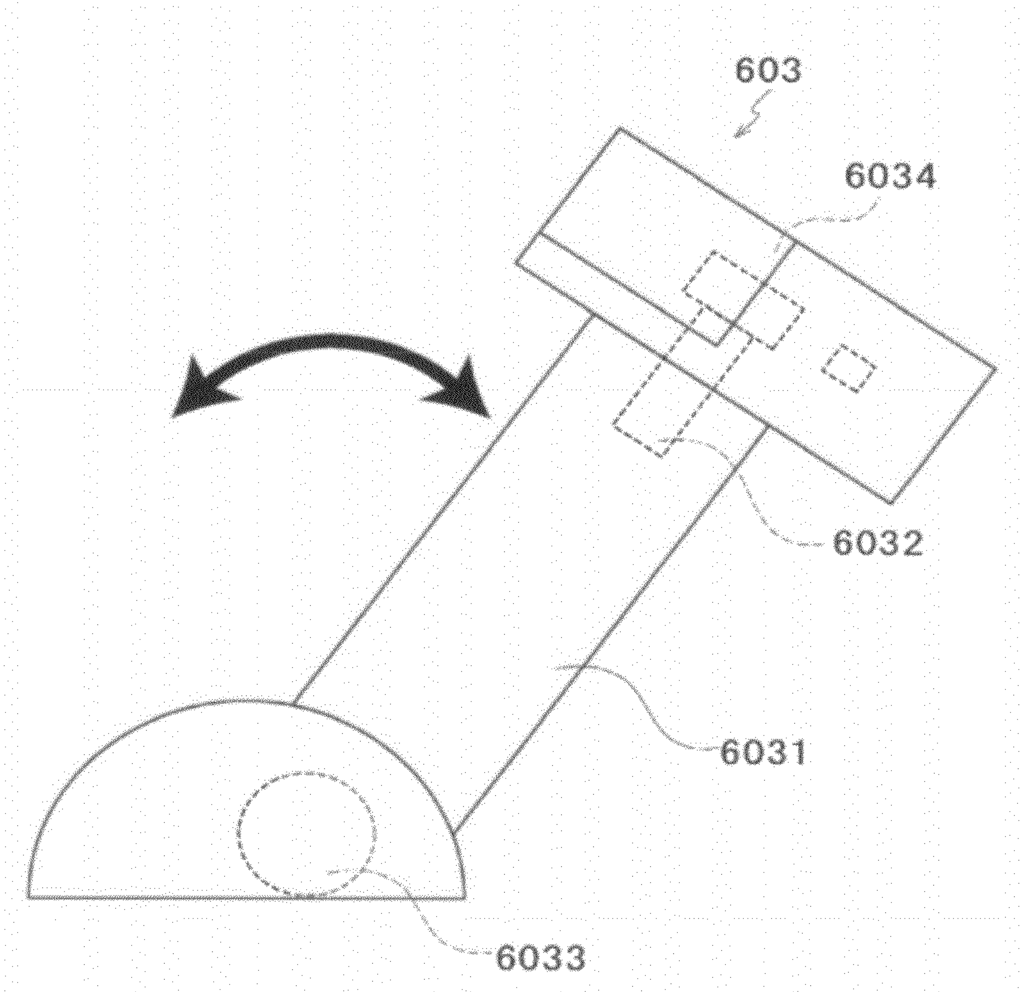
FIG. 3 is a schematic diagram of a control lever.

Referring to FIG. 3, the control lever 603 is here described. FIG. 3 is a schematic diagram of the control lever 603 observed in a horizontal direction. As shown in FIG. 3, the control lever 603 has a lever main body (lever) 6031 for a player to hold, a vibration motor (first motor) 6032 provided in the lever main body 6031 and enabling the lever to vibrate, a rotation motor 6033 provided in the lever main body 6031 and applying a force on the lever 6031 in a predetermined rotation direction, and a Light Emitting Diode (LED) (light emitting device) 6034 provided at an upper part of the lever main body 6031.

A cross section of the lever main body 6031 is structured to have an approximate T shape, and is provided with a light emitting portion for accommodating the LED 6034 and a holding portion to be held by the player at the upper part thereof. At the light emitting portion of the lever main body 6031, a light-transmissive cover for transmission of the light of the LED 6034 is provided. At an upper part of the holding portion, the vibration motor (not shown) is accommodated, and the vibration motor vibrates through a driving device that is not shown. In addition, the control lever 603 can rotate in forward and backward directions when observed from the front of the gaming machine 10 (directions of the arrow in FIG. 3). At a position located in the cabinet 11 at a lower part of the holding portion of the control lever 603, the rotation motor 6033 is provided. The rotation motor 6033 imparts the rotatable control lever 603 with a torque in a rotation direction through the driving device, which is not shown.

In addition, the control lever 603 is connected to a magnet (not shown). The magnet rotates in a linked manner with the control lever 603 through the linkage with the rotation shaft rotating through the control lever 603. Accordingly, the magnet changes an external magnetic field through the rotation of the control lever 603. In addition, near the magnet, a magnetic force detecting section (not shown) is fixedly mounted. The magnetic force detecting section is provided with a magnetic force sensor for outputting a magnetic force detection signal of an output intensity corresponding to a magnetic force, and a sensor fixing section for fixing the magnetic force sensor at a predetermined position. The magnetic force detecting section detects a magnetic force of a magnetic field generated by the magnet, wherein the magnetic force changes associated with the rotation of the control lever 603.

(Electrical Structure of Gaming Machine)

Figure 4:
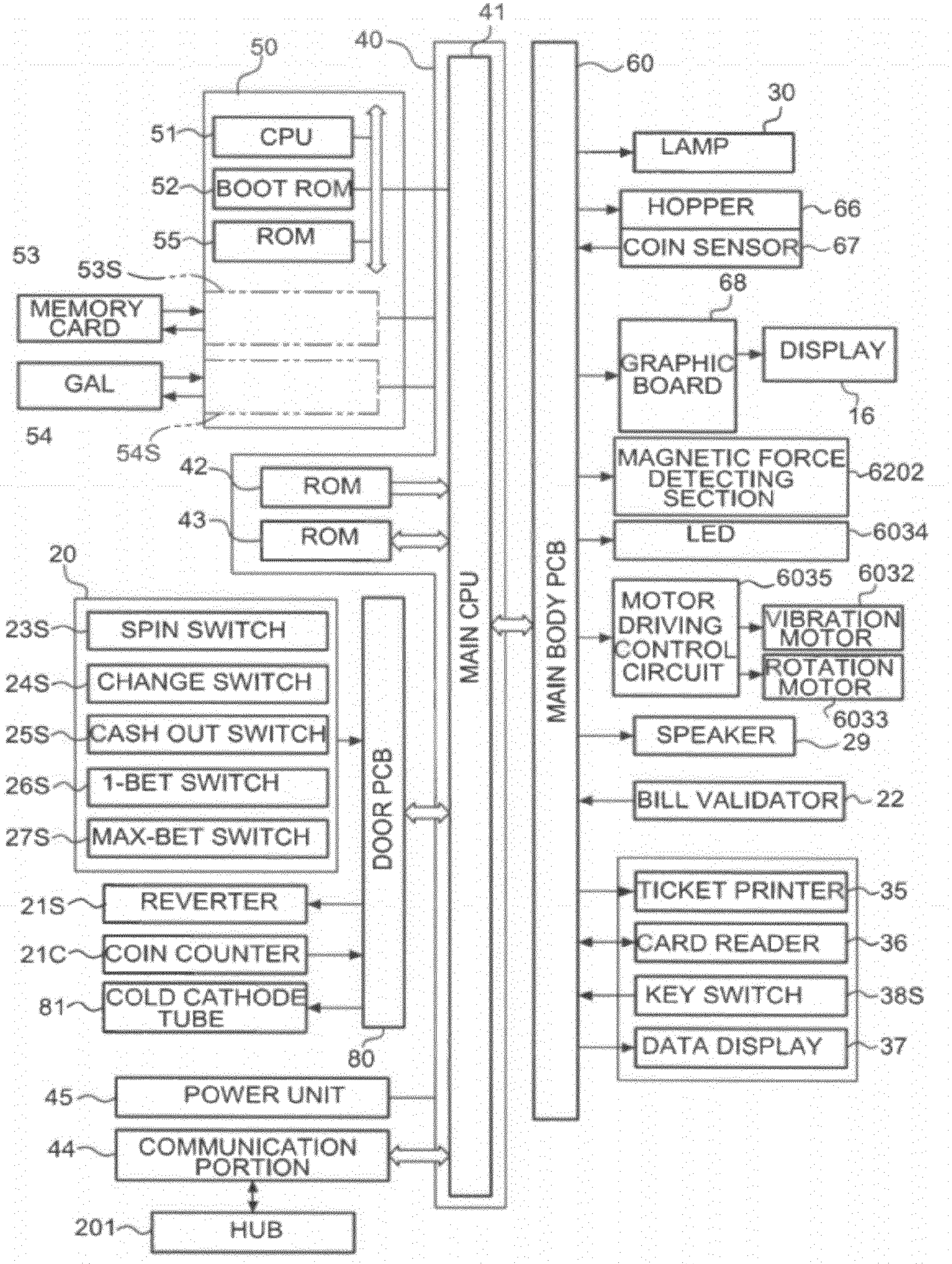
FIG. 4 is a schematic view of internal connections of a gaming machine.

FIG. 4 is a block diagram of the overall electrical structure of the gaming machine 10. As shown in FIG. 4, inside the cabinet 11, a control section including a terminal controller 630 is provided. As shown in FIG. 4, the control section comprises a motherboard 40, a main body Print Circuit Board (PCB) 60, a gaming board 50, a door PCB 80, and various switches and sensors.

The gaming board 50 is provided with a CPU 51, a Read Only Memory (ROM) 55, and a Boot ROM 52 which are connected to each other by an internal bus, a card slot 53S corresponding to a memory card 53, and an IC socket 54S corresponding to a Generic Array Logic (GAL) 54.

The memory card 53 stores a game program and a game system program. The game program comprises a stop symbol determining program. The stop symbol determining program is a program for determining a symbol (code number corresponding to the symbol) to be stopped in the display window 150. The stop symbol determining program comprises symbol weight data respectively corresponding to each of a plurality of payout ratios (for example, 80%, 84%, 88%). The symbol weight data is data representing a correspondence relation between the code number of each symbol and one or more random numbers belonging to a predetermined numerical range (0 to 256) for each of the video reels 151 to 155.

The payout ratio is determined on the basis of data for setting a payout ratio, which data is output from the GAL 54, and a stop symbol is determined on the basis of the symbol weight data corresponding to the payout ratio.

Further, the memory card 53 stores various data used for the game program and the game system program. For example, the data representing a relationship between the symbols 501 displayed in the video reels 151 to 155 and the range of random numbers is stored in table form. In addition, the data is transmitted to the Random Access Memory (RAM) 43 of the motherboard 40 when executing the game program.

In addition, the card slot 53S is structured to allow insertion and removal of the memory card 53 and is connected to the motherboard 40 through an Integrated Drive Electronics (IDE) bus. Accordingly, it is possible to change the type or content of a game to be executed in the gaming machine 10 by removing the memory card 53 from the card slot 53S, writing another game program and game system program in the memory card 53, and inserting the memory card 53 into the card slot 53S.

The game program comprises a program relating to a game progress and a program for shifting the gaming state into a bonus game. In addition, the game program comprises image data or voice data to be output during the game.

The GAL 54 is provided with a plurality of input and output ports. When the data is input into the input ports, the GAL 54 outputs corresponding data from the output ports. The data output from the output ports are the data for setting the payout ratio mentioned above. In addition, in this embodiment, the data for setting the payout ratio set in the base game is set to be fixed to any one of the above values (for example, 80%, 84%, 88%), i.e., even when a payout ratio increasing game is executed, the data for setting the payout ratio (the data for setting the payout ratio in the base game) is not changed. That is, the payout ratio set in the base game is not changed; instead, the payout ratio is changed by the payout ratio increasing game as a result.

The IC socket 54S is structured to allow the GAL 54 to be attached and detached. The IC socket 54S is connected to the motherboard 40 through a peripheral component interconnect (PCI) bus. Accordingly, it is possible to change the data for setting the payout ratio output from the GAL 54 by detaching the GAL 54 from the IC socket 54S, rewriting the program stored in the GAL 54, and then attaching the GAL 54 to the IC socket 54S.

The CPU 51, the ROM 55, and the boot ROM 52, which are connected to each other by the internal bus, are connected to the motherboard 40 through the PCI bus. The PCI bus carries out a signal transfer between the motherboard 40 and the gaming board 50, and supplies power to the gaming board 50 from the motherboard 40. The ROM 55 stores nation identification information and an authentication program. The boot ROM 52 stores a preliminary authentication program and a program (boot code) enabling the CPU 51 to execute the preliminary authentication program.

The authentication program is a program (falsification check program) for authenticating the game program and the game system program. The authentication program is a program for confirming and verifying that the game program and the game system program are not falsified. In other words, the authentication program is written following a procedure for authenticating the game program and the game system program. The preliminary authentication program is a program for authenticating the authentication program. The preliminary authentication program is written following a procedure for verifying that the authentication program to be authenticated is not falsified, i.e., for authenticating the authentication program.

The motherboard 40 is provided with a main CPU 41 (terminal controller 630), a ROM 42, a RAM 43, and a communication portion 44.

The main CPU 41 comprises functionality as a terminal controller 630 for controlling the whole gaming machine 10. In particular, the main CPU 41 carries out a control for outputting an instruction signal to scroll the symbols 501 to a graphic board 68 when the spin button 23 is pushed after the credit is bet, a control for determining symbols 501 to be stopped after the symbols 501 are scrolled, and a control for stopping the determined symbols 501 in the video reels 151 to 155.

In other words, the main CPU 41 has functions as an arrangement controller for selecting and determining the arrangement of symbols with regard to a symbol matrix from the plurality of types of symbols so as to rearrange them as a new symbol matrix after scrolling the plurality of symbols to be displayed on the display 16, and executing an arrangement control which will be stopped at the determined symbols from the scroll state.

The ROM 42 stores a program such as a Basic Input/Output System (BIOS) executed by the main CPU 41, and stores data that is permanently used. When the BIOS is executed by the main CPU 41, each of peripheral devices is initialized and the game program and the game system program stored in the memory card 53 are read out through the gaming board 50. The RAM 43 stores the data or program which is used when the main CPU 41 carries out a process.

The communication portion 44 is provided to communicate with a host computer and the like through a communication line, which is mounted in the game arcade. In addition, the communication portion 44 is provided to communicate with a central controller 200 through a hub 201 and the communication line. In addition, the motherboard 40 is respectively connected to the main body PCB 60 and the door PCB 80 through a Universal Serial Bus (USB). Further, the motherboard 40 is connected to a power section 45. When power is supplied to the motherboard 40 from the power section 45, the main CPU 41 of the motherboard 40 is operated, and the power is supplied to the gaming board 50 through the PCI bus, so that the CPU 51 can operate.

The main body PCB 60 and the door PCB 80 are connected to an apparatus or a device for producing an input signal which will be input to the main CPU 41, and an apparatus or a device which is controlled by the control signal output from the main CPU 41. The main CPU 41 executes the game program and the game system program stored in the RAM 43, based on the input signal input to the main CPU 41 to carry out an arithmetic process, thereby storing a result thereof in the RAM 43 or transmitting a control signal to each apparatus or device to control it.

The main body PCB 60 is connected with the lamp 30, a hopper 66, a coin sensor 67, the graphic board 68, the speaker 29, the bill validator 22, the ticket printer 35, the card reader 36, a key switch 38S, and the data display 37.

The lamp 30 is turned on/off on the basis of the control signal output from the main CPU 41.

The hopper 66 is mounted in the cabinet 11 and pays out a predetermined number of coins to the coin tray 18 from the coin payout slot 19, based on the control signal output from the main CPU 41. The coin sensor 67 is mounted in the coin payout slot 19 and outputs an input signal to the main CPU 41 when it detects that the predetermined number of coins are paid out from the coin payout slot 19.

The graphic board 68 controls an image display in the display 16, based on the control signal outputted from the main CPU 41. In addition, the graphic board 68 is provided with a Video Display Processor (VDP) for producing image data on the basis of the control signal output from the main CPU 41, and a video RAM for temporarily storing the image data produced by the VDP, and the like. In addition, the image data used when the VDP produces the image data is included in the game program which is read from the memory card 53 and stored in the RAM 43.

The bill validator 22 reads an image of the bill and receives a genuine bill in the cabinet 11. In addition, when receiving the genuine bill, the bill validator 22 outputs an input signal to the main CPU 41, based on the amount of the bill. The main CPU 41 stores a credit-value, which corresponds to the amount of the bill transmitted by the input signal, in the RAM 43.

The ticket printer 35 prints a barcode having data encoded thereto, such as credit-value stored in the RAM 43, date and time, identification number of the gaming machine 10 and the like, on a ticket, based on the control signal output from the main CPU 41, and outputs the ticket 39 having the barcode.

The card reader 36 reads the data from the smart card and transmits it to the main CPU 41, or writes the data onto the smart card, based on the control signal output from the main CPU 41. The key switch 38S is mounted to the keypad 38, and outputs an input signal to the main CPU 41 when the player manipulates the keypad 38. The data display 37 displays the data which is read by the card reader 36 or the data which the player inputs through the keypad 38, based on the control signal output from the main CPU 41.

The door PCB 80 is connected with the control panel 20, a reverter 21S, a coin counter 21C, and a cold cathode tube 81. The control panel 20 is provided with a spin switch 23S corresponding to the spin button 23, a change switch 24S corresponding to the change button 24, a cash out switch 25S corresponding to the cash out button 25, a 1-BET switch 26S corresponding to the 1-BET button 26, and a MAX-BET switch 27S corresponding to the MAX-BET button 27. Each of the switches 23S to 27S outputs an input signal to the main CPU 41 when each of the corresponding buttons 23 to 27 is pushed by a player.

The coin counter 21C is mounted in the coin receiving slot 21 and validates whether a coin inserted in the coin receiving slot 21 by the player is genuine. Any non-genuine coin is discharged from the coin payout slot 19. In addition, the coin counter 21C outputs an input signal to the main CPU 41 when it detects a genuine coin.

The reverter 21S is operated on the basis of the control signal output from the main CPU 41 and distributes a coin, which is recognized as a genuine coin by the coin counter 21C, to a cash box (not shown) or hopper 66 mounted in the gaming machine 10. In other words, when the hopper 66 is fully filled with the coins, the genuine coin is distributed into the cash box by the reverter 21S. In the meantime, when the hopper 66 is not fully filled with coins, the genuine coin is distributed into the hopper 66. The cold cathode tube 81 functions as a backlight mounted to rear sides of the display 16 and an upper image display panel 33 and is turned on based on the control signal output from the main CPU 41.

In addition, the main body PCB 60 is connected with a motor driving control circuit 6035. The motor driving control circuit 6035 controls driving of the vibration motor 6032 and the rotation motor 6033. In addition, the main body PCB 60 is connected with the LED 6034. The main body PCB 60 controls light emission of the LED 6034. In addition, the main body PCB 60 is connected with a magnetic force detecting section 6202. As described above, the magnetic force detecting section 6202 is for detecting a magnetic force representing a position of the control lever 603, and transmitting a magnetic force signal to the main body PCB 60.

(Base Game)

Next, the base game independently executed in the gaming machine 10 is described. In this embodiment, the base game comprises an ordinary game and a bonus game.

(Symbols, Combinations, and the Like)

Figure 5:
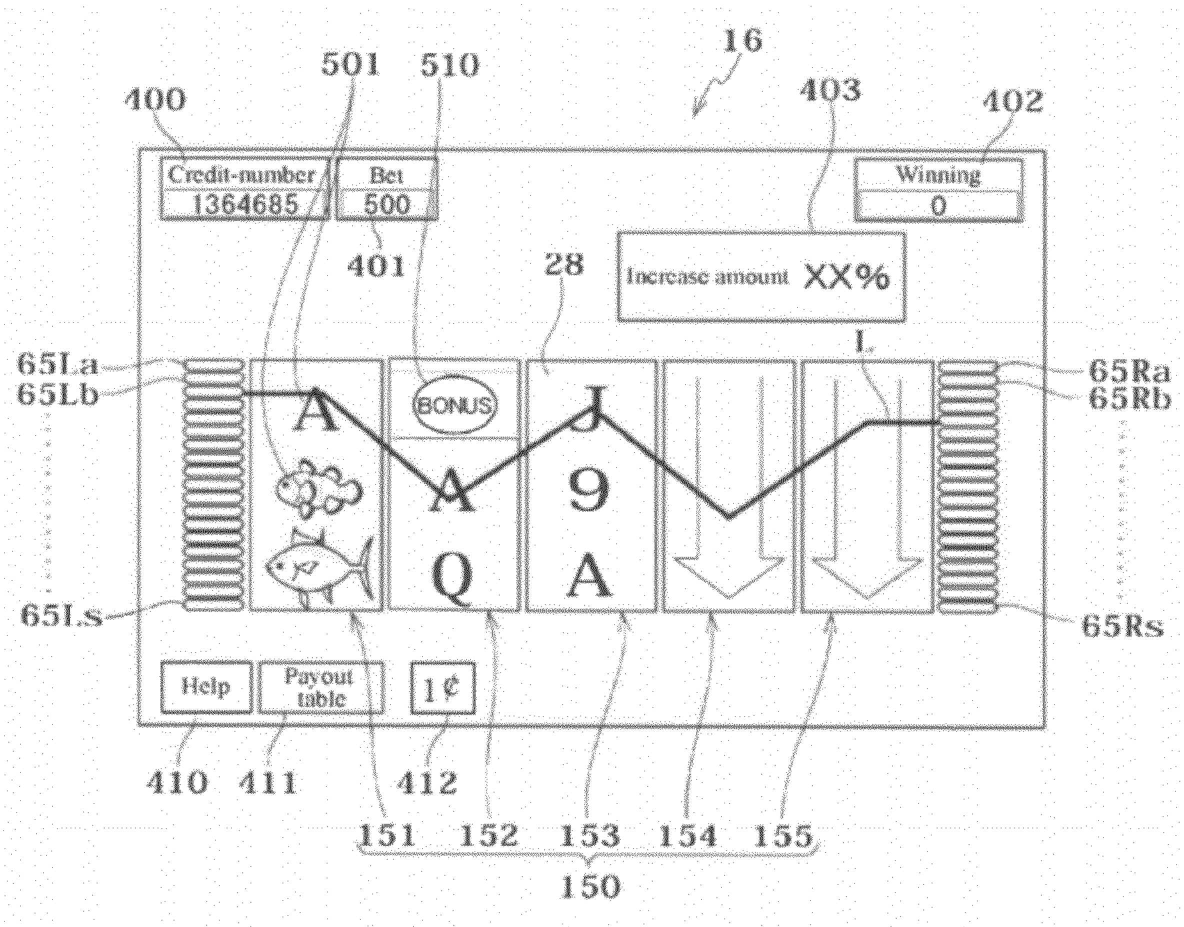
FIG. 5 is a schematic view of an example of a display picture of a base game.

For symbols 501 displayed on the video reels 151 to 155 of the display 16 for displaying the base game, a plurality of symbols 501 is formed into symbol sequences. As shown in FIG. 5, in the display 16, a display window 150 formed of the video reels 151 to 155 is displayed. The display window 150 is formed of 15 display blocks 28 in 5 columns and 3 rows. In other words, each of the video reels 151 to 155 is respectively formed of 3 display blocks 28. Each of the video reels 151 to

155 can enable 3 display blocks 28 to integrally change speed while moving downward to be displayed (scroll-displayed), so as to carry out the rearrangement which stops the symbols 501 displayed in each display block 28 after spinning the symbols 501 in a vertical direction.

Pay line generation columns are symmetrically arranged at a left side and a right side of the display window 150. The pay line generation column at the left side as observed from the side of the player, as shown in FIG. 5, comprises 19 pay line generation portions 65L (65La, 65Lb, 65Lc, 65Ld, 65Le, 65Lf, 65Lg, 65Lh, 65Li, 65Lj, 65Lk, 65Ll, 65Lm, 65Ln, 65Lo, 65Lp, 65Lq, 65Lr, 65Ls).

In the meantime, the pay line generation column at the right side comprises 19 pay line generation portions 65R (65Ra, 65Rb, 65Rc, 65Rd, 65Re, 65Rf, 65Rg, 65Rh, 65Ri, 65Rj, 65Rk, 65Rl, 65Rm, 65Rn, 65Ro, 65Rp, 65Rq, 65Rr, 65Rs).

The pay line generation portion 65L forms a pair with any of the pay line generation portions 65R. A pay line L from each pay line generation portion 65L to the pay line generation portion 65R having a paired relationship with the pay line generation portion 65L is predetermined. In addition, in FIG. 5, for ease of description, only one pay line L is drawn, but in this embodiment, 10 pay lines L are predetermined.

The pay line L is activated through a connection between the pay line generation portions 65L and 65R; otherwise, the pay line L is inactivated. The number of activated pay lines L is determined on the basis of the BET amount. In the case of the maximum BET amount, i.e., MAX-BET, the maximum number of pay lines L, i.e., 10 pay lines, are activated. The activated pay lines L make all winning combinations relating to the symbols 501 satisfied. Detailed description of the winning combinations is provided in the following contents.

In addition, in this embodiment, the case in which the gaming machine 10 is a so-called video slot machine is described, but in the gaming machine 10 of the present invention, so-called mechanical reels may replace a part of the video reels 151 to 155.

As shown in FIG. 6, the symbols 501 forming each symbol sequence are imparted with any codes from 0 to 19. Each symbol sequence is formed of a symbol combination of symbols 501 such as "Special symbols 510", "A", "Q", "J", "K", "Angelfish", "Clownfish", "Tuna", and "Coelacanth".

As shown in FIG. 5, 3 continuous symbols 501 in the symbol sequence are respectively displayed (arranged) at an upper part, a middle part, and a lower part of a display area of each of the video reels 151 to 155, so as to form a symbol matrix having 5 columns and 3 rows in the display window 150. If a start button 23 is pushed to start the game, the symbols 501 forming the symbol matrix start scrolling. If a predetermined time has passed after the scrolling is started, the scrolling of all symbols 501 is stopped (rearranged).

In addition, various winning combinations are predetermined for all symbols 501. In addition, the winning combinations represent prize winning. The winning combination is a combination where the combination of symbols 501 stopped on the pay line L becomes a beneficial state for a player. The so-called beneficial state is a state where coins corresponding to winning combinations are to be paid out, a state where the payout value of the coins is to be added to the credit, a state where the bonus game is to be started, or the like.

In this embodiment, the winning combinations refer to cases where at least one type of symbol 501 among the "A", "Q", "J", "K", "BAT", "Angelfish", "Clownfish", "Tuna", and "Coelacanth" are rearranged on activated pay lines L with a number higher than the predetermined number. In addition, when the symbols 501 of the predetermined types are set to scatter symbols, the winning combinations are formed in the cases of rearrangement with a number higher than the predetermined number regardless of whether the pay lines L are activated or inactivated.

For example, in the ordinary game, in the cases where the symbols 501 of "BAT" are stopped on the pay line L in the form of a winning combination, the payout value of coins (value) obtained by multiplying the basic payout value of "BAT" by the BET amount is paid out.

(Symbol Table)

FIG. 6 is a symbol table used when determining the symbols 501 as the rearrangement objects used in the ordinary game. In the symbol table, a correspondence relation is established between each symbol 501 of the display block 28 in each symbol sequence and a code No., and a correspondence relation is established between a random number range obtained by dividing a range from 0 to 65535 into 20 parts and each code No.

In addition, the division may be uniform or non-uniform. When the division is non-uniform, the winning probability based on the ranges of the random numbers can be adjusted on the basis of the types of symbols 501. In addition, the ranges corresponding to special symbols 510 can also be set to a range narrower than symbols 501 of other types. At this time, based on the conditions of the games, it is difficult to win the valuable types of symbols 501, so the winning and losing can be easily adjusted.

For example, in a first column, if a randomly selected random number is 10000, the "J" of the code No. 3 having a correspondence relation established with a random number range including the random number becomes a rearrangement object in the video reel 151 of the first column. In addition, for example, in a fourth column, if the randomly selected random number is 40000, the "special symbol 510" of the code No. 12 having a correspondence relation established with a random number range including the random number becomes a rearrangement object in the video reel 151 of the fourth column.

(Base Game: Ordinary Game Picture)

FIG. 5 shows an example of a display picture of an ordinary game, i.e., an ordinary game picture, in the terminal image display panel 16.

Specifically, an ordinary game picture comprises a display window 150 having 5 columns of video reels 151 to 155 arranged at a central part, and pay line generation portions 65L and 65R symmetrically arranged with the display window 150 as a center. In addition, in the ordinary game picture in FIG. 5, the video reels 151, 152, and 153 in the first to the third columns are in a stopped state, and the video reels 154 and 155 in the fourth and fifth columns are being scroll-displayed.

A credit-value display section 400 and a BET value display section 401 are arranged at the left side at the upper part of the terminal image display panel 16, and a payout display section 402 is arranged at the right side.

The credit-value display section 400 displays a credit-value. The BET value display section 401 displays a BET amount in a current unit game. The payout display section 402 displays a payout value of coins at a winning combination.

In the meantime, below the display window 150, a help button 410, a payout table button 411, and a BET unit display section 412 are arranged, in sequence from left to right as observed by a player.

The help button 410 can execute a help mode through push operation of a player. The help mode is a mode for providing information to answer game related questions for a player. The payout table button 411 can execute a payout display mode for displaying payout contents through push operation of a player. The payout display mode is a mode for displaying an instruction picture representing a relationship between a winning combination and a payout rate to a player.

The BET unit display section 412 displays a current BET unit (payout unit). Accordingly, the BET unit display section 412 enables a player to learn that the player can join in the game with, for example, 1 cent as a unit.

Above the display window 150, a payout ratio increase amount display section 403 is arranged. The payout ratio increase amount display section 403 displays an increase amount of a payout ratio in a payout ratio increasing game relative to the payout ratio in the base game (an increased amount of the obtained number of coins). Accordingly, the player can learn that a current state is more beneficial than the base game. In addition, the payout ratio increase amount display section 403 also displays in the picture of the base game of the display 16 as shown in FIG. 5, and also displays in the picture of executing the payout ratio increasing game (the picture of the display 16).

(Payout Ratio Increasing Game: Game Picture)

Figure 7:
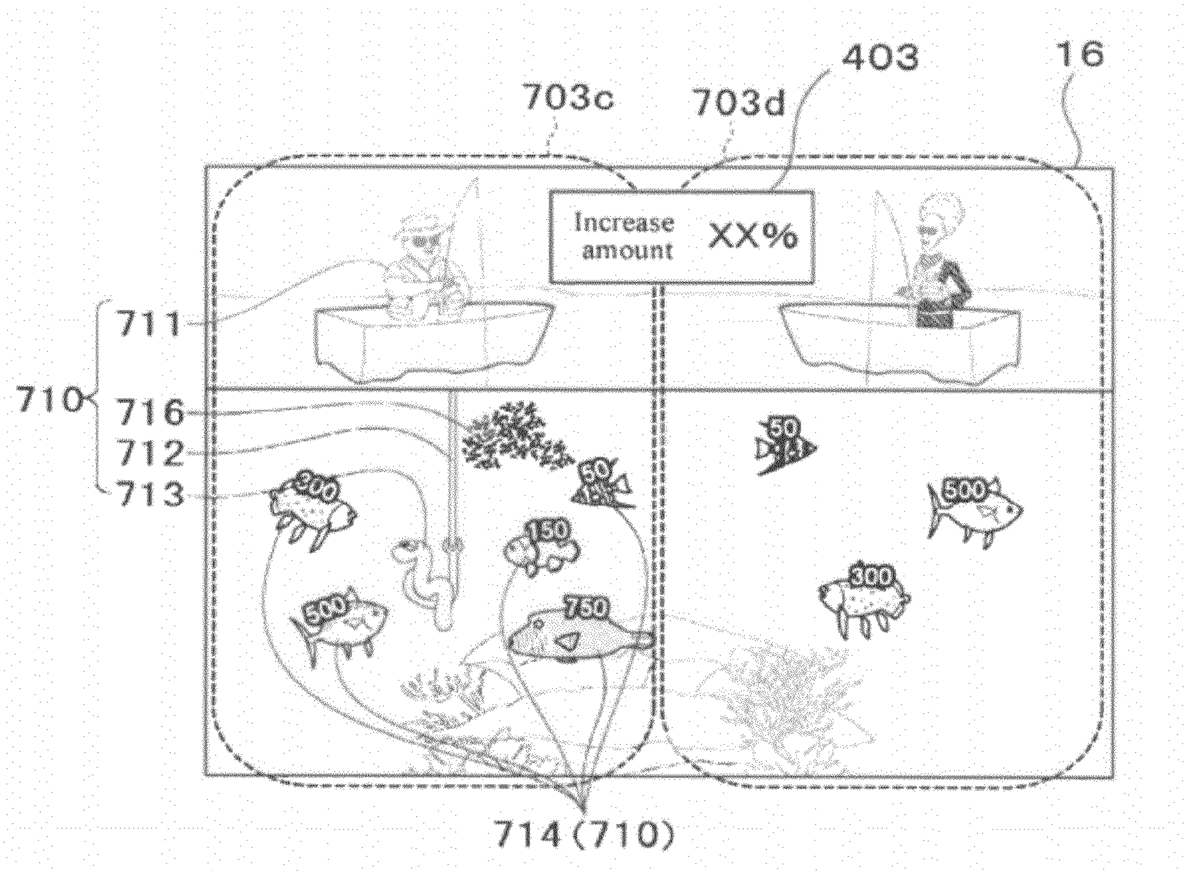
FIG. 7 is a schematic view of an example of a display picture in a payout ratio increasing game.

FIG. 7 is a diagram of a picture displayed on the display 16 in the payout ratio increasing game. As shown in FIG. 7, in the picture, individual images 710 including an angler image 711, a hook image 712, a bait image 713, and a fish image 714 are displayed. In addition, in the picture of the display 16, an image area 703*c* for displaying individual images 710 changing corresponding to operations on the control lever 603 (FIG. 2) by the player and an image area 703*d* for displaying images of the fishing by an angler not operated by the player are provided.

The hook image 712 is displayed by a display image changing with the control lever 603. The bait image 713 is displayed at the lower end portion of the hook image 712.

The fish image 714 represents a unit payout amount in the payout ratio increasing game based on the size of a fish. Various fish images 714 are displayed close to the bait image 713 or swimming around the bait image 713.

Figure 8:
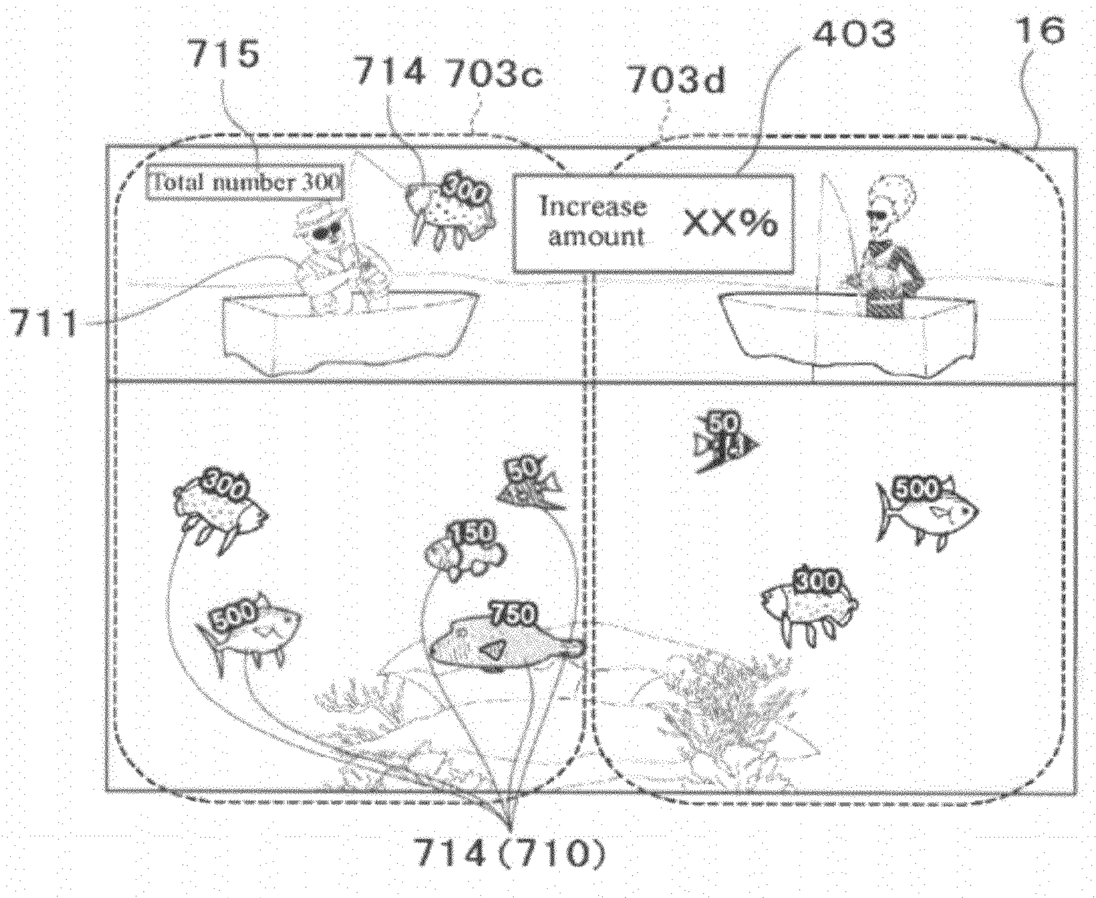
FIG. 8 is a schematic view of an example of a display picture in a payout ratio increasing game.

According to the movement of the fish images 714, the player performs an operation of pulling the control lever 603, and if the operation is performed at a proper time, as shown in FIG. 8, an image in which the angler (angler image 711) catches a fish (fish image 714) is displayed.

If the result that the fish is successfully caught corresponding to the time of the operation is obtained, the number of coins (payout) set in the payout ratio increasing game is awarded to the player. The number of coins is set to a number having a higher payout ratio than the payout ratio in the base game.

For example, as shown in FIG. 9, in the payout ratio increasing game, the unit payout amount corresponding to the type of the caught fish is set in the RAM 43. In the payout ratio increasing game, on the basis of the unit payout amount table, the payout awarded to the player is determined. For example, a blue marlin corresponds to a unit payout amount of 10000, and a black sea bass corresponds to a unit payout of 1000. The selection of one of the various fishes is determined through selection by using a probability table for the payout ratio increasing game in FIG. 10. Corresponding to the random numbers in the probability table, the probabilities of catching the various fishes are determined. In other words, the blue marlin having the highest payout amount has the lowest selection probability based on the distributed random number. Accordingly, the operation time of the control lever 603 for catching the blue marlin is set to a shorter time. In other words, if the player fails to operate the control lever 603 at a more accurate time, the player is unable to catch the blue marlin. In addition, a fish set with a lower probability of being selected is also set with a lower probability of being close to the hook image 712 (bait image 713). Accordingly, it is set that the probability of catching the fish becomes lower.

(Processing Operation of Gaming Machine: Base Game Processing Routine)

Figure 11:
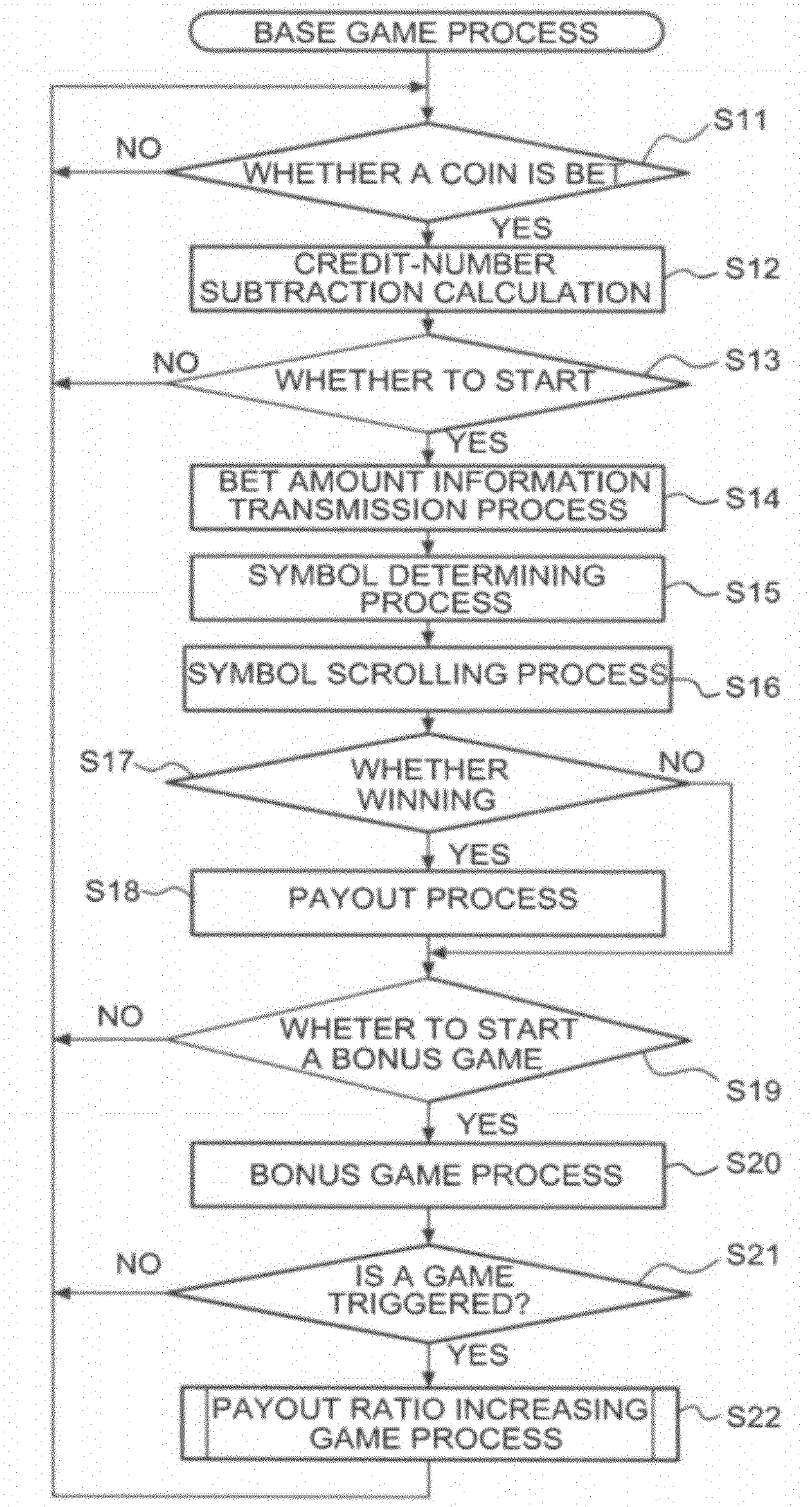
FIG. 11 is a flow chart of a processing procedure of a base game.

The main CPU 41 of the gaming machine 10 executes the base game processing routine as shown in FIG. 11. The main CPU 41 executes the base game processing routine program to execute the base game.

As shown in FIG. 11, in the base game processing routine, it is determined whether a coin is bet (S11). In this process, it is determined whether an input signal output from the 1-BET switch 26S as the 1-BET button 26 is pushed is received, and whether an input signal outputted from the MAX-BET switch 27S as the MAX-BET button 27 is pushed is received. When the coin is not bet (S11: NO), S11 is re-executed and the gaming machine is under a standby state until a coin is bet.

In the meantime, when the coin is bet (S11: YES), the credit-value stored in the RAM 43 is subtracted, correspondingly to the number of coins bet (S12). In addition, if the number of coins bet is larger than the credit-value stored in the RAM 43, the process of subtracting the credit-value is not carried out and the process proceeds to step S13. In addition, if the number of coins bet is above the upper limit (50 pieces in this embodiment) which can be bet per game, the process of subtracting the credit-value is not carried out and the process proceeds to step S13.

Next, it is determined whether the game is started by the spin button 23(S13). If it is not started (S13: NO), the process is returned to step S11. In addition, if it is not started (for example, if it is not started and an instruction to end the game is input), the subtraction resulted in step S12 is canceled.

In the meantime, if the game is started (S13: YES), a BET amount information transmission process is executed (S14). In other words, the BET amount information signal representing the game value bet is transmitted to an external control device of the game arcade provided with the gaming machine 10. The external control device manages the game state of each gaming machine 10 based on the information.

Next, a symbol determining process is executed (S15). In other words, a stop symbol determining program stored in the RAM 43 is executed, so that the symbols 501 which will be stopped in the display window 150 are determined. Accordingly, a combination of symbols to be stopped on the pay line L is determined.

Next, a scroll process of scroll-displaying the symbols 501 in the display 16 is executed (S16). In the scroll process, the symbols 501 are scrolled in the direction indicated by an arrow symbol and then the symbols 501 determined in the step of S15 are stopped (rearranged) in the display window 150.

Next, on the basis of the combination of symbols 501 rearranged in the display window 150, it is determined whether the combination is a winning combination or not (S17). When it is determined that the combination is a winning combination (S17: YES), the payout process is executed (S18). In other words, if a winning combination is determined, the number of coins to be paid out is calculated on the basis of the prize In the meantime, in the process in S17, when it is determined that the combination is not a winning combination (S17: NO), the process in S19 is executed.

If the payout process in S18 is executed, the main CPU 41 continues to determine whether a bonus game is started (S19). Specifically, the main CPU 41 determines that the bonus game is started when special symbols 510 of a number higher than the predetermined number are rearranged on the pay line L, or the special symbols 510 are not arranged in the video reel 153 in the third column and instead a mystery bonus is won through selection. If the bonus game is not started (S19: NO), the process of S11 is executed.

When the bonus game is started (S19: YES), a bonus game process is executed (S20). In the bonus game process, the main CPU 41 selects the bonus. Specifically, referring to the probability table for the bonus, the range of winning bonus type to which the selected random number belongs is determined. Next, the main CPU 41 awards the payout corresponding to the winning bonus, and the bonus game process is ended. Next, it is determined whether a game is triggered for shifting to the payout ratio increasing game (S21). Specifically, the main CPU 41 determines whether specific triggering conditions are satisfied (for example, in the state where the combination of symbols 501 stopped on the pay line L in the base game is close to the beneficial winning combination for the player, and the like). When the game is not triggered (S21: NO), the process of S11 is executed.

Figure 12:
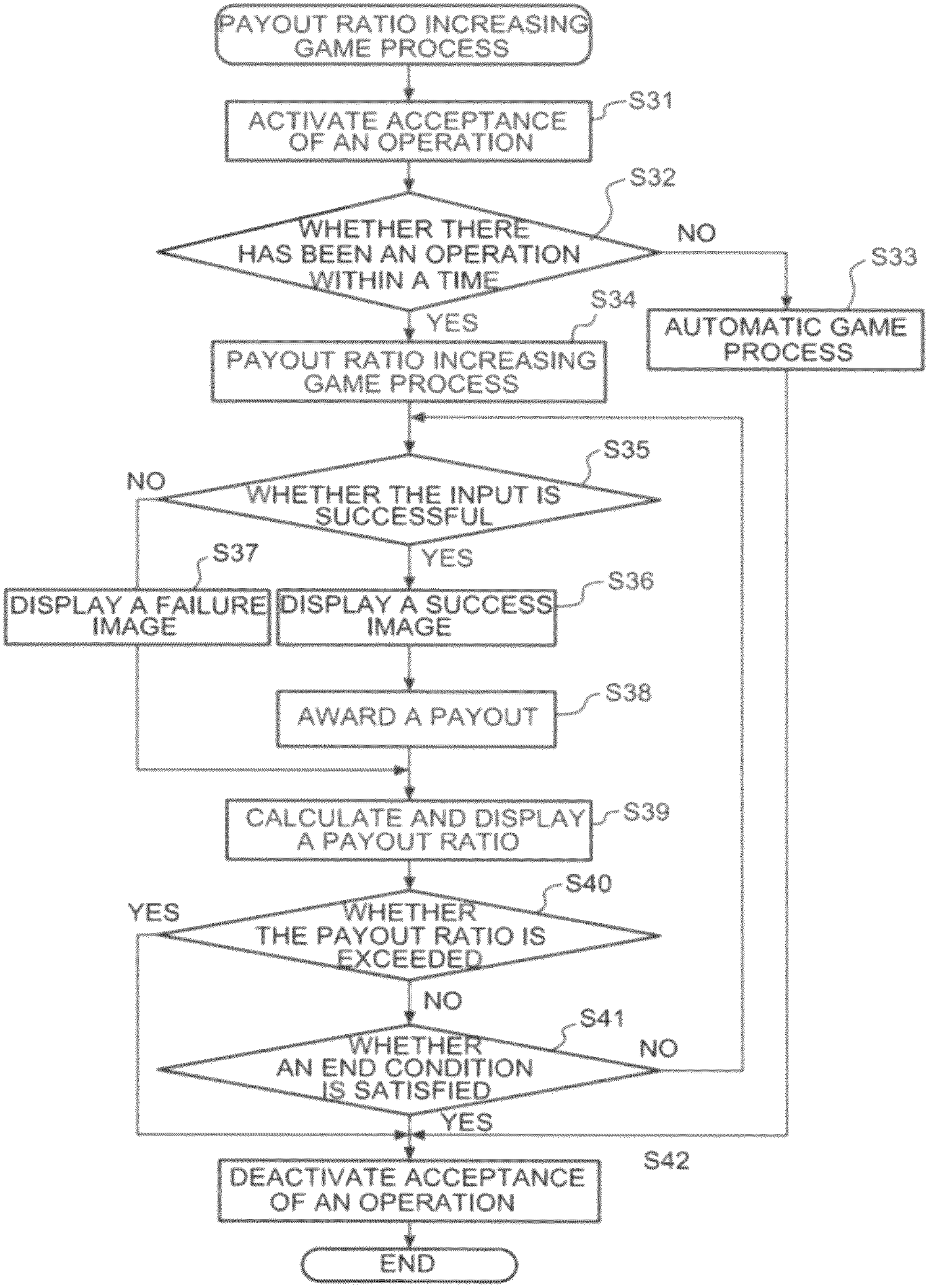
FIG. 12 is a flow chart of a processing procedure of a payout ratio increasing game.

In the meantime, when the game is triggered (S21: YES), the payout ratio increasing game process is executed (S22). Referring to FIG. 12, the payout ratio increasing game process is described hereinafter. Next, the process in S11 is executed.

(Processing Operation of Gaming Machine: Payout Ratio Increasing Game Processing Routine)

The main CPU 41 of the gaming machine 10 executes the payout ratio increasing game processing routine as shown in FIG. 12 in the payout ratio increasing game process (the process of S22) as shown in FIG. 11.

As shown in FIG. 12, the main CPU 41 activates the acceptance of the operation of the control lever 603 (S31), and subsequently, it is determined whether there has been an operation of the control lever 603 within the preset processing time (S32). When there has been no operation of the control lever 603 within the preset time (S32: NO), it can be determined that the player does not want to operate the control lever 603 by himself to execute the payout ratio increasing game, so the main CPU 41 automatically executes the payout ratio increasing game (S33). The automatic game process is a game in which the main CPU 41 automatically executes the fishing game on the basis of the automatic game payout ratio preset in a specific storage area in the RAM 43. The automatic game payout ratio is set to a value that is higher than the payout ratio set in the base game (for example 80%, 84% or 88%) and lower than 100%. The content of the automatic game is displayed on the display 16. The main CPU 41 inactivates the acceptance of the operation of the control lever 603 after executing the automatic game for a predetermined time (S42), and the payout ratio increasing game is ended.

When it is determined that there has been an operation of the control lever 603 within the predetermined time (S32: YES), the main CPU 41 executes the payout ratio increasing game process while the player himself operates the control lever 603 (S34). The payout ratio increasing game is the game being executed while the image relating to the fishing game as shown in FIGS. 7 to 10 is displayed on the display 16. The player can execute fishing game through the operation of the control level 603, which is activated only when the payout ratio increasing game is being executed.

Next, the main CPU 41 determines whether the operation of the control lever 603 is successful (i.e., whether the fishing pole is pulled out at the time capable of catching a fish in the fishing game) in the payout ratio increasing game (S35).

When the input is successful (S35: YES), the main CPU 41 displays a success image of catching a fish on the display 16 (FIG. 8) (S36), and gives the payout corresponding to the caught fish (S38). If the input fails (i.e., the fish is not caught) (S35: NO), the main CPU 41 displays a failure image representing failure to catch a fish on the display 16 (S37).

Subsequently, the main CPU 41 calculates a payout ratio corresponding to an operation result (success or failure) of the control lever 603, stores the calculation result in a corresponding area in the RAM 43, and displays the calculation result on the display 16 (S39). Specifically, a ratio of the changed payout ratio in the payout ratio increasing game (input success or input failure) to the payout ratio set in the base game is displayed in numbers. The so-called payout ratio refers to the ratio of the number of coins to be paid out (the payout) to the number of inserted coins. In this embodiment, a coin has to be inserted (bet) in the base game, but in the payout ratio increasing game, no coin needs to be inserted (bet). Therefore, if the input operation of the control lever 603 is successful, as the number of coins inserted in the base game is thus far unchanged, the ratio of the number of coins to be paid out in the payout ratio increasing game to the number of coins, i.e., the payout ratio (the payout ratio of the payout ratio increasing game) is increased; and if the operation fails, the payout ratio is not changed. Further, the target payout ratio preset in the base game and the target payout ratio (allowable payout ratio) in the payout ratio increasing game are separately stored in corresponding areas in the RAM 43 respectively.

The main CPU 41 determines whether the calculated payout ratio exceeds the allowable payout ratio preset in the RAM 43 (S40). The allowable payout ratio is determined in consideration of the interests of the game arcade, and is set to a value that is higher than the fixed payout ratio (for example, 80%, 84% or 88%) preset in the base game and lower than 100%. The allowable payout ratio is set such that when the value is exceeded, the payout ratio increasing game is ended, thereby providing a higher payout ratio than that in the base game while still preserving the interests of the game arcade.

When determining that the calculated payout ratio does not exceed the allowable payout ratio (S40: NO), the main CPU 41 determines whether an end condition of the payout ratio increasing game is satisfied (S41). In this embodiment, the end condition uses a determination reference of whether the time from the beginning of the payout ratio increasing game reaches the time preset in the RAM 43; but the present invention is not limited thereto. For example, other conditions such as the number of times of operation of the control lever 603 can be used as reference.

When the end condition is not satisfied (S41: NO), the main CPU 41 returns to the process of S33 to continue the payout ratio increasing game. On the other hand, when the end condition is satisfied (S41: YES), or when it is determined that the payout ratio exceeds the allowable payout ratio (S40: YES), the main CPU 41 deactivates acceptance of the operation of the control lever 603 (S42), so as to end the payout ratio increasing game.

As described above, in the gaming machine 10 in this embodiment, regardless of the payout ratio set in the base game, the payout (number of coins) to be paid out to the player is determined corresponding to the result of the payout ratio increasing game. Accordingly, when the operation of the control lever 603 by the player in the payout ratio increasing game is successful, the proportion of the payout (number of coins) awarded in the payout ratio increasing game is increased, compared with the payout ratio in the base game. In other words, in the payout ratio increasing game, a higher payout can be obtained depending on the skill of the player, in comparison with the payout obtained according to the payout ratio set in the base game.

Other Embodiments

Figure 13:
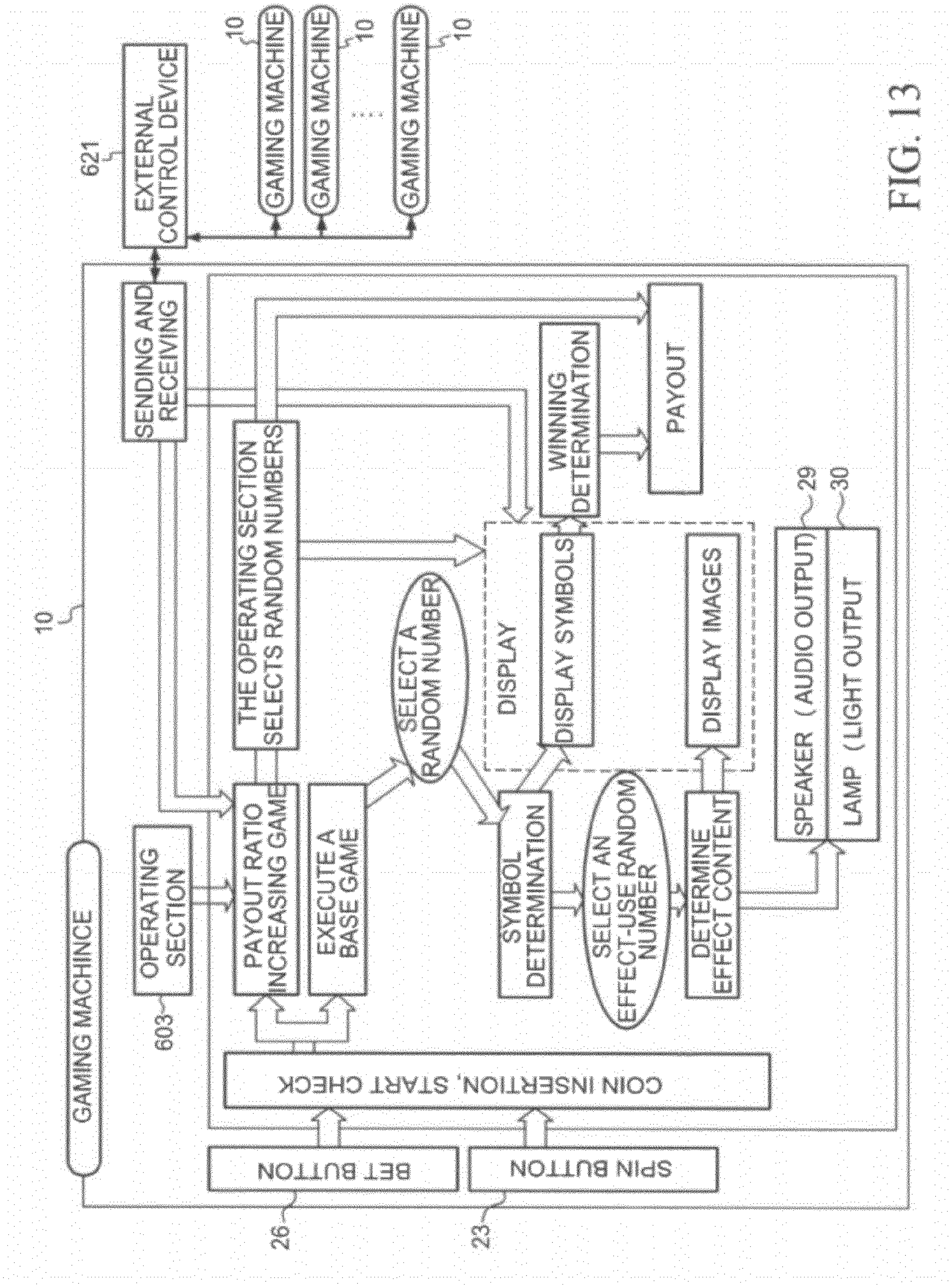
FIG. 13 is a general schematic view of a gaming machine according to another embodiment.

The above embodiment describes the case in which the base game and the payout ratio increasing game are executed in the gaming machine 10 and the corresponding result (the increase amount of the payout ratio) is displayed on the display 16. However, the present invention is not limited thereto. For example, as shown in FIG. 13, the ranking of the increase amounts of the payout ratio increasing games among a plurality of gaming machines 10 mounted in the game arcade is made, and the ranking of the gaming machines 10 is displayed on each display 16. Accordingly, the ranking corresponding to player skill in operating the control lever 603 is displayed, thereby heightening interest in the payout ratio increasing game.

Figure 14:
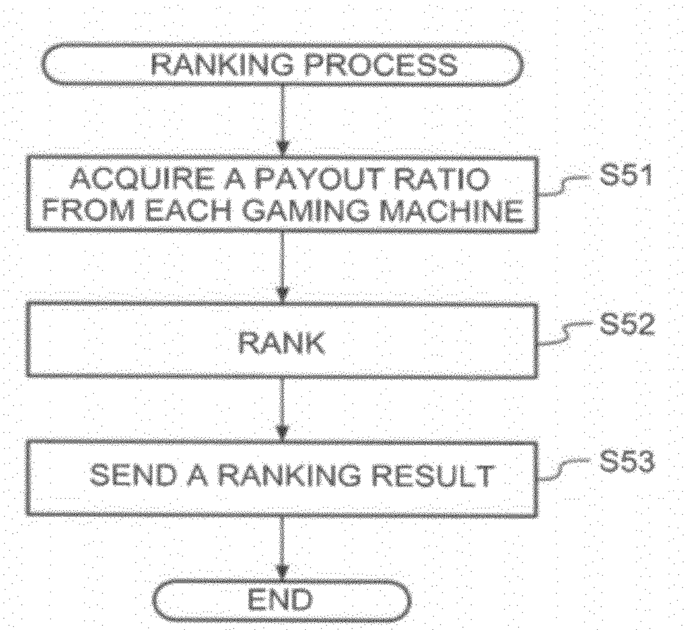
FIG. 14 is a flow chart of a ranking process according to another embodiment.

The external control device managing the gaming machines 10 determines respective ranking by using the ranking process shown in FIG. 14, based on the payout ratios changed in the payout ratio increasing games executed in the gaming machines 10, and transmits the resulting information on rankings to the gaming machines 10.

Specifically, as shown in FIG. 14, the external control device 621 acquires the payout ratios of the payout ratio increasing games from the gaming machines 10, and stores the payout ratios in an internal RAM (not shown) (S51).

Next, the external control device 621 calculates the ranking of the payout ratios of the payout ratio increasing games in the gaming machines 10 stored in the RAM (S52). The external control device 621 stores the ranking data in the internal RAM, and transmits the ranking data to the gaming machines 10. The ranking data is the data which indicates each of the gaming machines 10 and the ranking corresponding to the ranking of the gaming machines 10.

Accordingly, each of the gaming machines 10 displays the ranking corresponding to the gaming machines 10 on the displays 16 thereof, based on the ranking data transmitted from the external control device 621. Accordingly, the players playing the game in each of the gaming machines 10 can confirm the ranking of the payout ratio increasing games in the gaming machine 10. Each time the operation of the control lever 603 by the player in the payout ratio increasing game succeeds, the ranking rises, so the players may enjoy the spirit of competition.

The embodiment above describes the case in which the increase amount of the payout ratio is displayed on the display 16 of the gaming machine 10; however, the present invention is not limited thereto, and the number of coins actually paid out to the player may also be displayed, as long as the payout awarded to the player in the payout ratio increasing game is displayed.

The embodiment above also describes the case in which the base game is executed as the first game; however, the present invention is not limited thereto, and a variety of games other than the base game may also be used as the first game, for example a mystery bonus game.

(General Description of Gaming Machine)

The gaming machine 10 in this embodiment comprises: a display 16 arranging a plurality of symbols; and a control section (main CPU 41) executing a first game (base game) rearranging the plurality of symbols with a preset payout ratio, and awarding a payout to a player on the basis of a result of the first game (base game), and executing a payout ratio increasing game that increases the payout ratio and is only executable when predetermined conditions are satisfied, and awarding a payout to the player on the basis of a result of the payout ratio increasing game, wherein the control section (main CPU 41) executes the payout ratio increasing game, in which the preset payout ratio changes in a predetermined range.

According to the above embodiment, the payout ratio set in the first game (base game) does not need to be changed, and the payout ratio actually paid out to the player can be changed depending on the result of the payout ratio increasing game.

Another aspect of the present invention is that the gaming machine 10 further comprises an operating section (control lever 603) activating acceptance of an operation if the predetermined conditions are satisfied, wherein in the payout ratio increasing game, the result of the payout ratio increasing game is determined on the basis of an operation result of the operating section (control lever 603).

According to the above aspect of the invention, the player can enjoy playing the payout ratio increasing game different from the first game through his own operation of an operating section (control lever 603), which is activated only when the payout ratio increasing game is being executed.

Another aspect of the present invention is that the gaming machine 10 further comprises a display section (main CPU 41 and display 16) displaying a payout awarded to the player in the payout ratio increasing game.

According to the above aspect of the invention, the player may be highly concerned about the payout ratio increasing game due to the displayed payout in the payout ratio increasing game. The payout may be in the form of a number of coins to be actually paid out, or may alternatively be a ratio of the payout ratio in the payout ratio increasing game to the target payout ratio set in the first game (base game).

LIST OF REFERENCE NUMERALS

10 Gaming machine
16 Display
41 Main CPU
150 Display window
151 to 155 Video reel
501 Symbols
603 Control lever

I claim:

1. A gaming machine in which a payout ratio can be changed via player skill, comprising:

a display arranging a plurality of symbols; and a control section that executes 1) a first game in which the plurality of symbols are rearranged with a preset payout ratio and in which a payout is awarded to a player on the basis of a result of the first game; and 2) a payout ratio increasing game in which the payout ratio can be determined via skill of the player in playing the payout ratio increasing game; which is only executable when predetermined conditions are satisfied; and in which a payout to the player is awarded on the basis of a result of the payout ratio increasing game, wherein the control section executes the payout ratio increasing game, in which the preset payout ratio changes in a predetermined range; and wherein the control section is configured to automatically execute the payout ratio increasing game in the absence of player input and ends the automatically executed payout ratio increasing game after executing the automatically executed payout ratio increasing game for a predetermined time.

2. The gaming machine according to claim 1, further comprising:

an operating section activating acceptance of an operation if the predetermined conditions are satisfied, wherein in the payout ratio increasing game, the result of the payout ratio increasing game is determined on the basis of an operation result of the operating section.

3. A gaming machine in which a payout ratio can be changed via player skill, comprising:

a display arranging a plurality of symbols; and a control section that executes 1) a first game in which the plurality of symbols are rearranged with a preset payout ratio and in which a payout is awarded to a player on the basis of a result of the first game; and 2) a payout ratio increasing game in which the payout ratio can be determined via skill of the player in playing the payout ratio increasing game; which is only executable when predetermined conditions are satisfied; and in which a payout to the player is awarded on the basis of a result of the payout ratio increasing game, wherein the control section executes the payout ratio increasing game, in which the preset payout ratio changes in a predetermined range; and wherein the payout ratio increasing game is ended when the payout ratio exceeds a preset allowable payout ratio.

4. The gaming machine according to claim 3, further comprising:

an operating section activating acceptance of an operation if the predetermined conditions are satisfied, wherein in the payout ratio increasing game, the result of the payout ratio increasing game is determined on the basis of an operation result of the operating section.

5. The gaming machine according to claim 1, 3, 2, or 4, further comprising:

a display section displaying a payout awarded to the player in the payout ratio increasing game.

* * * * *